Patented Nov. 28, 1933

1,936,949

UNITED STATES PATENT OFFICE 1,936,949

VAT DYESTUFFS OF THE ANTHRAQUINONE SERIES

Paul Nawiasky and Emil Krauch, Ludwigshafen-on-the-Rhine, and Berthold Stein, Mannheim, Germany, assignors to General Aniline Works, Inc., New York, N. Y., a corporation of Delaware No Drawing. Application January 22, 1932, Serial No. 588,234, and in Germany January 28, 1931

8 Claims. (Cl. 260—44)

The present invention relates to new vat dyestuffs of the anthraquinone-acridone and anthraquinone-thioxanthone series, and process of producing same.

We have found that valuable vat dyestuffs are obtained by condensing an anthraquinone acridone or anthraquinone thioxanthone carboxylic acid or a substitution product thereof with an aromatic amine which is substituted in the ortho-position to the amino group by an OH, SH or NO2 group or halogen, whereby compounds of the general formula:

in which A, B and R are mono- or polynuclear aromatic radicals of which at least A or B is an anthraquinone radical, X is an imino group or a sulphur atom and Y is a sulphur or oxygen atom are obtained either directly or by the action of condensing agents on the acylamines intermediately produced. The condensation of the anthraquinone acridone or anthraquinone thioxanthone carboxylic acid or their substitution products with the said aromatic amines is preferably effected by heating the said substances together in solution or suspension if desired in the presence of condensing agents, as for example alkali metal carbonates, acetates and the like. As substitution products of the anthraquinone acridone or anthraquinone thioxanthone carboxylic acids may be mentioned the chlorides, anhydrides and esters of the said acids. The initial material may also be substituted in the anthraquinone nucleus of the said acridone and thioxanthone carboxylic acids, thus they may be substituted by halogen, alkyl, alkoxy, amino groups and amino groups in which a hydrogen atom is repaced by alkyl, aryl or acyl radicals. The same substituents may also be present in the aromatic amines. The condensation is preferably carried out in high boiling inert, in particular aromatic solvents, such as nitrobenzene, halogenbenzenes and homologues thereof, naphthalene, its homologues and halogen derivatives thereof. The condensation is preferably carried out at temperatures above 150° C., since generally speaking, at these temperatures condensation and ring closure is simultaneously effected. When by the condensation an intermediate product is formed it may be readily converted into the said final product by ring closure by treatment with condensing agents, such as sulphuric acid, p-toluene-sulphonic acid, or alkali metal carbonates or acetates. When employing in the initial condensation amines containing a halogen atom in ortho-position to the amino group, agents supplying sulphur may be employed in the conversion of the intermediate products, whereby thiazoles are obtained.

The following examples will further illustrate the nature of this invention but the invention is not restricted to these examples. The parts are by weight.

Example 1

10 parts of the chloride of 1.2(S)-anthraquinone-thioxanthone-Bz4-carboxylic acid of the formula:

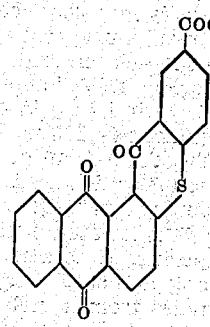

(obtainable for example by condensation of 2-brom-anthraquinone-1-carboxylic acid with para-mercapto-benzoic acid, thioxanthone ring closure by means of sulphuric acid and conversion into the carboxylic acid chloride by means of thionyl chloride) are heated at from 190° to 200° C. with 7 parts of 1-mercapto-2-aminoanthraquinone in 170 parts of nitrobenzene until the formation of the dyestuff is completed. The dyestuff may be purified by dissolution and precipitation from sulphuric acid and subsequent treatment with hypochlorite solution. It dyes cotton greenish yellow shades having good fastness properties from a dark violet vat.

Example 2

20.2 parts of 1.2(S)-anthraquinone-thioxanthone-Bz2-carboxylic acid chloride having the formula:

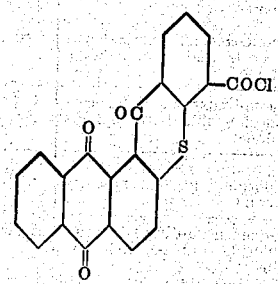

(obtainable from 1-cyan-2-brom-anthraquinone and thiosalicylic acid, thioxanthone ring closure and conversion into the acid chloride) are heated to boiling with 12.7 parts of 1-mercapto-2-aminoanthraquinone in 3,000 parts of trichlorbenzene until the splitting off of hydrogen chloride and water has ceased. The dyestuff separates when cooled in the form of fine green yellow crystals. It is isolated in the usual manner and if desired purified by a subsequent treatment with hypochlorite solution. It dyes cotton very greenish yellow shades from an olive brown vat.

Example 3

2 parts of 2.1(S)-anthraquinone-thioxanthone-Bz2-carboxylic acid chloride having the formula:

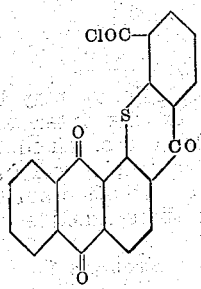

(obtainable by condensing 1-chlor-anthraquinone-2-carboxylic acid with thiosalicylic acid, effecting ring closure by means of acetic anhydride with an addition of sulphuric acid and converting the product into the acid chloride by treatment with thionyl chloride in o-dichlorbenzene) are heated at 190° C. with 1.2 parts of 1-amino-2-hydroxy-anthraquinone in 500 parts of trichlorbenzene until the formation of dyestuff has ceased. The dyestuff, which is difficultly soluble even in hot solvents, separates in the form of orange crystals. It is isolated in the usual manner and may be purified if necessary by fractionation from concentrated sulphuric acid. It dyes cotton yellow shades from a violet vat.

In a similar manner other oxazoles can be prepared from the components indicated in the following table which also gives the colour of the vat of the product and the shades of their dyeings on cotton.

| Condensation product from | Colour of the vat | Dyeing on cotton |
|---|---|---|
| 1.2 (S)-anthraquinone-thioxanthone-Bz2-carboxylic acid chloride and 1-amino-2-hydroxyanthraquinone | Dark violet | Yellow |
| 1.2 (S)-anthraquinone-thioxanthone-Bz4-carboxylic acid chloride and 1-amino-2-hydroxyanthraquinone | Dark violet | Yellow |
| 2.1 (S)-anthraquinone-thioxanthone-Bz4-carboxylic acid chloride and 1-amino-2-hydroxyanthraquinone | Violet | Orange |
| 2.1 (S)-anthraquinone-thioxanthone-6-carboxylic acid chloride and 1-amino-2-hydroxyanthraquinone | Blue | Orange |
| 3.2 (S)-anthraquinone-thioxanthone-Bz2-carboxylic acid chloride and 1-amino-2-hydroxyanthraquinone | Red-brown | Yellow |
| 3.2 (S)-anthraquinone-thioxanthone-Bz4-carboxylic acid chloride and 1-amino-2-hydroxyanthraquinone | Red to red-brown | Yellow |
| 2.1 (S)-anthraquinone-thioxanthone-Bz4-carboxylic acid chloride and 2-amino-3-hydroxyanthraquinone | Dark violet | Orange |
| 3.2 (S)-anthraquinone-thioxanthone-Bz2-carboxylic acid chloride and 2-amino-3-hydroxyanthraquinone | Brown | Yellow |
| 3.2 (S)-anthraquinone-thioxanthone-Bz4-carboxylic acid chloride and 2-amino-3-hydroxyanthraquinone | Yellow-brown | Yellow |

Example 4

2.2 parts of 2.1(N)-anthraquinone-1'.2'(N)-naphthacridone-3'-carboxylic acid chloride having the formula:

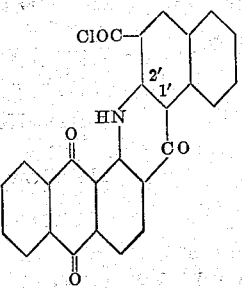

(obtainable by condensing 1-chloranthraquinone-2-carboxylic acid with 2-amino-3-naphthoic acid in aqueous suspension to which caustic alkali has been added, effecting ring closure and converting the product into the acid chloride) are heated at from 205° to 210° C. with 1.2 parts of 2-amino-3-hydroxyanthraquinone in 400 parts of nitrobenzene until no further increase in the amount of the difficultly soluble dyestuff can be observed. The dyestuff, obtained in the form of fine needles, is filtered by suction while hot and worked up in the usual manner. It dyes cotton reddish orange shades from a violet brown vat.

Example 5

20 parts of 1.2(S)-anthraquinone-thioxanthone-Bz2-carboxylic acid chloride corresponding to the formula:

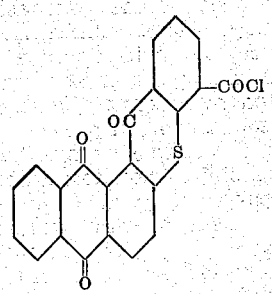

are heated with 13 parts of 1-chloro-2-aminoanthraquinone and 300 parts of nitrobenzene to between 190° and 195° C. until the evolution of hydrogen chloride has ceased. The mass is filtered by suction while still hot and the reaction product which separates in the form of yellow needles is freed from nitrobenzene by washing with ethyl alcohol. The product dyes cotton from a green vat faint greenish yellow shades.

2.9 parts of this product are heated in 55 parts of phenol with 6 parts of anhydrous sodium sulphide and 9 parts of sulphur to between 150° and 155° C. until the product is free from chlorine. The reaction mass is diluted with ethyl alcohol and the dyestuff filtered off by suction, freed from phenol by washing with ethyl alcohol and treated with boiling sodium hypochlorite solution. It corresponds in its properties with the dyestuff described in Example 2.

In a similar manner other thiazoles can be prepared from the components indicated in the following table which also gives the colour of the vat of the product and the shades of their dyeings on cotton.

| Condensation product from | Colour of the vat | Dyeing on cotton |
|---|---|---|
| 2.1 (S) - anthraquinone - thioxanthone - Bz4-carboxylic acid chloride and 1-mercapto-2-aminoanthraquinone | Red-violet | Orange |
| 3.2 (S) - anthraquinone - thioxanthone - Bz2-carboxylic acid chloride and 1-mercapto-2-aminoanthraquinone | Brown | Yellow |
| 3.2 (S) - anthraquinone - thioxanthone - Bz4-carboxylic acid chloride and 1-mercapto-2-aminoanthraquinone | Red-brown | Reddish-yellow |
| 3.2 (S) - anthraquinone - thioxanthone - Bz2-carboxylic acid chloride and o-aminomercaptobenzene | Yellowish-brown | Yellow |
| 2.1 (S) - anthraquinone - thioxanthone - Bz2-carboxylic acid chloride and 1-mercapto-2-aminoanthraquinone | Violet | Orange |
| 3.2 (S) - anthraquinone - thioxanthone - Bz3-carboxyic acid chloride and 1-mercapto-2-aminoanthraquinone | Brown | Yellow |
| 2.1 (S) - anthraquinone - thioxanthone - 6 - carboxylic acid chloride and 1-mercapto-2-aminoanthraquinone | Blue violet | Orange |
| 3.2 (S) - anthraquinone - thioxanthone - Bz4-carboxylic acid chloride and 1-amino-2-mercapto-anthraquinone | Red-brown | Yellow |

The 3.2(S)-anthraquinone-thioxanthone-Bz2-carboxylic acid chloride is obtainable by condensation of 2-chloranthraquinone-3-carboxylic acid with thiosalicylic acid in aqueous suspension to which caustic alkali has been added, effecting ring closure by means of sulphuric acid and converting the product into the carboxylic acid chloride. The 3.2(S)-anthraquinone-thioxanthone-Bz4-carboxylic acid chloride is obtainable in the same manner when using p-mercaptobenzoic acid instead of thiosalicylic acid, and the corresponding Bz3-carboxylic acid chloride when employing m-mercaptobenzoic acid instead of thiosalicylic acid.

*Example 6*

38,7 parts of anthraquinone-2.1(N)-benzacrione-Bz4-carboxylic acid chloride are heated to boiling for 2 hour in 1500 parts of nitrobenzene with 24 parts of 1-amino-2-hydroxy-anthraquinone whereby a vigorous evolution of hydrogen chloride takes place. The dyestuff separates in the form of orange crystals. After cooling, the dyestuff is filtered off and freed from nitrobenzene by washing with benzene. It dyes cotton clear brownish orange shades from a red violet vat.

What we claim is:

1. The process of producing vat dyestuffs, which comprises condensing an anthraquinone derivative selected from the group consisting of anthraquinone acridones and anthraquinone thioxanthones containing a carboxylic acid, carboxylic chloride or esterified carboxylic acid group, with an aromatic amine substituted in the ortho-position to the amino group by a substituent selected from the group consisting of halogen, hydroxy, mercapto and nitro groups.

2. Vat dyestuffs corresponding to the general formula:

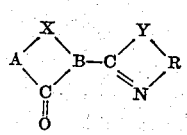

in which A, B and R stand for aromatic radicals of which at least A or B is an anthraquinone radical, X stands for an amino group or a sulphur atom and Y for a sulphur or oxygen atom, which dyestuffs dye the vegetable fiber yellow to brown shades from red brown to violet vats.

3. Vat dyestuffs corresponding to the general formula:

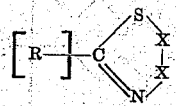

wherein the two X's are vicinal members of an aromatic radicle and R corresponds to the formula:

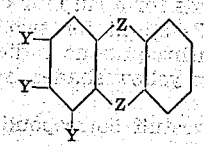

wherein one Z stands for C=O, the other Z for a nitrogen or sulphur atom, and wherein the radical

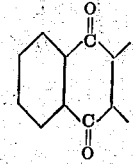

is attached to two vicinal positions marked Y, the other Y being hydrogen, which dyestuffs dye the vegetable fiber yellow to brown shades from red brown to violet vats.

4. Vat dyestuffs corresponding to the general formula:

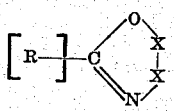

wherein the two X's are vicinal members of an aromatic radical and R corresponds to the formula:

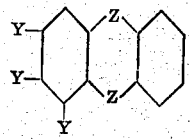

wherein one Z stands for C=O, the other Z for a nitrogen or sulphur atom, and wherein the radical

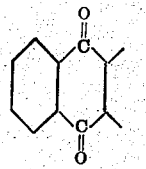

is attached to two vicinal positions marked Y, the other Y being hydrogen, which dyestuffs dye the vegetable fiber yellow to brown shades from red brown to violet vats.

5. Vat dyestuffs corresponding to the general formula:

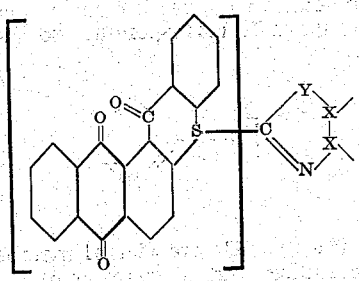

in which Y stands for a sulphur or oxygen atom, and the two X's stand for two vicinal carbon atoms of an anthraquinone radical, which dyestuffs dye cotton yellow shades from olive brown to violet vats.

6. The vat dyestuff corresponding to the formula:

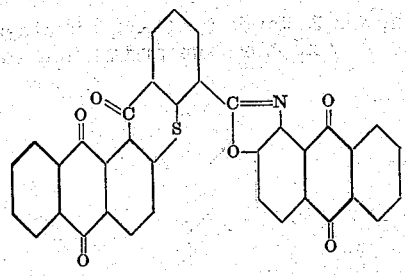

which dyestuff dyes cotton yellow shades from a dark violet vat.

7. The vat dyestuff corresponding to the formula:

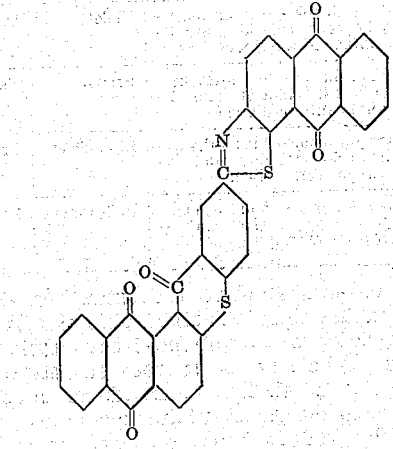

which dyestuff dyes cotton greenish yellow shades from an olive brown vat.

8. The vat dyestuff corresponding to the formula:

which dyestuff dyes cotton from a dark violet vat greenish yellow shades.

PAUL NAWIASKY.
BERTHOLD STEIN.
EMIL KRAUCH.